US012616978B2

(12) United States Patent
Gnam

(10) Patent No.: US 12,616,978 B2
(45) Date of Patent: May 5, 2026

(54) MINERAL PROCESSING PLANT

(71) Applicant: Kleemann GmbH, Göppingen (DE)

(72) Inventor: Michael Gnam, Blaubeuren (DE)

(73) Assignee: Kleemann GmbH, Göppingen (DE)

(*) Notice: Subject to any disclaimer, the term of this patent is extended or adjusted under 35 U.S.C. 154(b) by 385 days.

(21) Appl. No.: 18/561,766

(22) PCT Filed: May 31, 2022

(86) PCT No.: PCT/EP2022/064804
§ 371 (c)(1),
(2) Date: Nov. 17, 2023

(87) PCT Pub. No.: WO2023/274647
PCT Pub. Date: Jan. 5, 2023

(65) Prior Publication Data

US 2024/0238799 A1 Jul. 18, 2024

(30) Foreign Application Priority Data

Jun. 29, 2021 (DE) ..................... 10 2021 116 709.4

(51) Int. Cl.
*B02C 25/00* (2006.01)
*B02C 21/02* (2006.01)

(52) U.S. Cl.
CPC ............ *B02C 25/00* (2013.01); *B02C 21/026* (2013.01)

(58) Field of Classification Search
CPC .......... B02C 25/00; B02C 21/026; B02C 1/02
See application file for complete search history.

(56) References Cited

U.S. PATENT DOCUMENTS 7,464,889 B2 * 12/2008 Westerman ............. B07B 1/005 241/101.76
9,216,416 B2 * 12/2015 Peltomaki ............... B02C 2/005
11,097,281 B2 8/2021 Linder
11,571,700 B2 2/2023 Lindner et al.
(Continued)

FOREIGN PATENT DOCUMENTS

CN 201375916 Y 1/2010
CN 109414699 A 3/2019
(Continued)

OTHER PUBLICATIONS

International Search Report for corresponding patent application PCT/EP2022/064804, dated Oct. 11, 2022, 9 pages.
(Continued)

*Primary Examiner* — Sizo B Vilakazi
(74) *Attorney, Agent, or Firm* — Lucian Wayne Beavers; Patterson Intellectual Property Law, PC

(57) ABSTRACT

A mineral processing plant for crushing mineral material or the like, using a crushing device and an internal combustion engine. In a first mode of operation an internal combustion engine is mechanically coupled to the crushing device to drive the latter. A generator is provided, which is mechanically coupled to an internal combustion engine to drive this generator, and the generator is coupled to one or more auxiliary units to supply to supply electric power thereto. An electric motor is provided separately from the generator, which electric motor is mechanically coupled to the crushing device in a second operating mode to drive the crushing device.

20 Claims, 2 Drawing Sheets

(56) References Cited

U.S. PATENT DOCUMENTS

Figure 1:
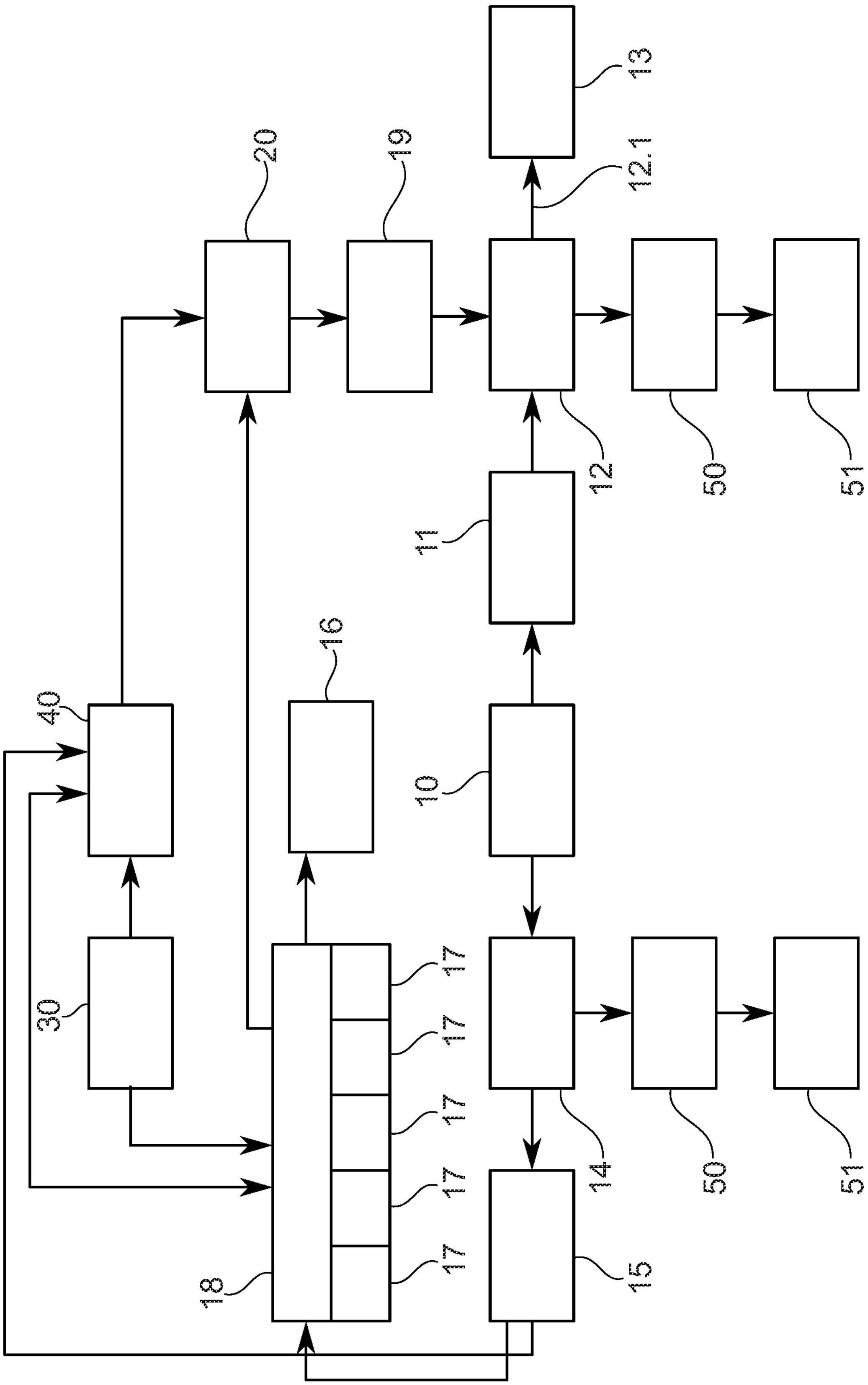

| | | | | |
|---|---|---|---|---|
| 2012/0234949 | A1 | 9/2012 | Morey | |
| 2014/0021280 | A1* | 1/2014 | Anttila | B02C 21/026 241/214 |
| 2016/0121338 | A1* | 5/2016 | Jonkka | B02C 1/043 241/30 |
| 2017/0014833 | A1* | 1/2017 | Mahonen | B02C 25/00 |
| 2019/0291120 | A1* | 9/2019 | Lindner | H02J 3/00 |
| 2020/0316611 | A1* | 10/2020 | Lindner | B02C 4/42 |
| 2021/0079837 | A1 | 3/2021 | Crankshaw et al. | |
| 2024/0066523 | A1* | 2/2024 | Gnam | B02C 13/30 |
| 2025/0269721 | A1* | 8/2025 | Gnam | B60K 6/387 |

FOREIGN PATENT DOCUMENTS

| | | | |
|---|---|---|---|
| CN | 109414700 | A | 3/2019 |
| DE | 102016012753 | A1 | 4/2018 |
| EP | 1770852 | A1 | 4/2007 |
| WO | 2017207350 | A1 | 12/2017 |

OTHER PUBLICATIONS

German office action for corresponding patent application 10 2021 116 709.4 dated May 6, 2022, 8 pages.

China Office Action for corresponding patent application No. 2025102401825420, dated Oct. 24, 2025, 16 pages including English language translation.

* cited by examiner

MINERAL PROCESSING PLANT

The invention relates to a mineral processing plant for crushing mineral material or the like, using a crushing device and an internal combustion engine, wherein in a first mode of operation the internal combustion engine is mechanically coupled to the crushing device to drive the latter, wherein a generator is provided, which is mechanically coupled to the internal combustion engine to drive this generator, and wherein the generator is coupled to one or more auxiliary units to supply electric power thereto.

Mineral processing plants according to the invention are used for various purposes. They are used, for instance, to crush and possibly screen recycling and/or rock material during processing. These machines can be used either as mobile or as stationary units. A feed unit is used to feed the material to be processed into the plant. Excavators or wheel loaders are usually used for this purpose. The excavator deposits the material to be crushed or screened out in a conveyor chute of the feed unit. Starting from the feed unit, a conveyor device is used to convey the material to be processed to a downstream crusher unit. This is where the material is then crushed.

In the context of the invention, a crusher unit may in particular be a jaw crusher unit having two crushing jaws, wherein preferably one of the crushing jaws is stationary and the other is movable. The crushing space is formed between the two crushing jaws, at least sectionally. Preferably, the crushing jaws are assigned to each other in such a manner that a tapering crushing space results. The two crushing jaws face each other in the area of a crusher outlet, wherein the crusher outlet can be formed by a crushing gap.

The crusher unit may also comprise a rotary impact crusher, a gyratory crusher, or a cone crusher.

From US 2021/0079837 A1 a material processing device having a main processing unit, for instance a crusher, is known.

Further provided are an internal combustion engine, a mechanical transmission system, at least one motor generator (electric motor that also enables generator operation), an electric system, and electrically operated auxiliaries.

In a steady-state first mode of operation, the internal combustion engine is coupled to and drives the main processing unit and motor generators via the mechanical transmission system. The electric power provided by the motor generators supplies the auxiliary units via the electric system.

Further, a power connection is provided for an external power supply to the material processing device in a further stationary operating mode (second operating mode). The externally provided electric power supplies the auxiliary units and drives the motor generators. The motor generators drive the main processing equipment via the mechanical transmission system, while the internal combustion engine is decoupled from the mechanical transmission system in this operating mode.

To move the material processing equipment, the internal combustion engine is mechanically uncoupled from the main processing equipment and drives a motor generator. The electric output power of the motor generator is used to operate the travel drives.

The motor generators have to be sufficiently powerful in the second operating mode to be able to drive the main processing equipment using the external power supply. For generator operation, however, the motor generators are oversized. This results in unfavorable efficiency factor in generator operation.

Mobile mineral processing plants are operated both in locations where local emission-free operation is possible and desirable or mandatory, and in locations where there is no possibility of an external power supply. It would therefore be desirable to have a mineral processing plant that provides optimum energy-efficient operation regardless of the mode of operation.

The invention addresses the problem of providing a mineral processing plant of the type mentioned above, which makes for a more effective operation.

This problem is solved by providing an electric motor separate from the generator, which electric motor is mechanically coupled to the crushing device in a second operating mode to drive the crushing device.

The fact that the electric motor and the generator are provided separately means that they can each be optimized according to the requirements. In this way, oversizing or undersizing the electric motor and generator can be avoided, which increases the energy efficiency of the mineral processing plant.

Preferably, provision may be made for the generator to be mechanically coupled to the internal combustion engine in the first operating mode and for the electric motor to be mechanically disconnected from the generator and/or the internal combustion engine by means of a clutch.

The generator can then be driven by the internal combustion engine without the electric motor being dragged along. Thus, drag power losses can be avoided and the energy efficiency of the mineral processing plant can be further increased.

One conceivable variant of the invention is such that the electric motor can be coupled to the crushing device via a second clutch, that in the first operating mode the electric motor is disconnected from the crushing device by means of the second clutch and in the second operating mode the electric motor is connected to the crushing device by means of the second clutch.

In this way, the electric motor does not have to be dragged along in the first operating mode, avoiding power losses. In addition, local emission-free operation can be achieved in the second operating mode.

According to the invention, provision may also be made for the electric motor and the internal combustion engine to be jointly connected to the crushing device for load transmission in a third operating mode.

In that way, the electric motor can support the internal combustion engine during peak loads. The internal combustion engine can be dimensioned smaller and thus more compact and cost-effective, because its maximum power output only has to cover the average power requirement of the mineral processing plant. In addition, the design of the internal combustion engine can be optimized for the average power requirement of the mineral processing plant, wherein no or only small power reserves have to be provided for peak loads. This can increase the energy efficiency of the internal combustion engine.

Additionally or alternatively, provision may also be made for an energy storage device, in particular an accumulator, to be charged by the generator during the first operating mode, and for the electric motor to be supplied with electric energy from the energy storage device and/or an external power supply in the third operating mode.

The energy storage device can be charged via the generator (or via an external power supply) when the mineral processing plant is dealing with low loads or in standby. During peak loads, additional energy can be supplied to the electric motor from the energy storage device. In addition, the travel drive can be supplied with electric energy via the energy storage device to permit the mineral processing plant to be moved locally with zero emissions.

If provision is made for a first clutch to be disposed between the internal combustion engine and the crushing device, wherein the first clutch couples the internal combustion engine to the crushing device in the first operating mode and disconnects the internal combustion engine from the crushing device in the second operating mode, the internal combustion engine can be operated independently in the second operating mode.

The internal combustion engine, for instance, can be switched off but does not have to be dragged along, which can further increase the energy efficiency of the mineral processing plant. It is also conceivable that the internal combustion engine drives the generator in the second operating mode, which in turn can be used to supply the auxiliary units with electric power or to charge the energy storage device.

A particularly preferred embodiment of the invention is characterized in that, in the first operating mode, the internal combustion engine is connected to the crushing device via a first transmission and/or is connected to the generator via a second transmission.

The first and/or the second transmission can then be optimized independently for their intended use. Depending on the power characteristics of the internal combustion engine and the generator, the second transmission can be optimally designed, which on the one hand minimizes power losses on the transmission end and on the other hand allows the internal combustion engine and generator to be operated in favorable operating conditions. This results in an increased energy efficiency of the mineral processing plant. Similarly, the first transmission can be optimally adapted to the power transmission requirements between the internal combustion engine and the crushing device. A particularly compact, cost-effective and simple design is achieved when the generator and second transmission form a single unit as a transmission-generator.

A mineral processing plant according to the invention may be characterized in that the first transmission is integrated in the drivetrain between the internal combustion engine and the crushing device, and in that the first transmission is also integrated in the drivetrain between the electric motor and the crushing device.

Thus, a transmission can be used to couple the electric motor and the internal combustion engine to the crushing device. This results in a compact and inexpensive design. The first transmission can be optimized to meet the requirements of the crusher. In addition, the first transmission permits the electric motor and the internal combustion engine to jointly act on the crushing device, such that any power peaks that occur can be handled efficiently.

If provision is made for the first clutch to be integrated in the drivetrain between the internal combustion engine and the first transmission and the second clutch to be integrated in the drivetrain between the electric motor and the first transmission, the electric motor and the internal combustion engine can be coupled to the crushing device independently of each other.

Depending on the operating mode and/or the power requirements of the crushing device, the crushing device can be driven by the electric motor, the internal combustion engine, or both. If there is no need to use both motors for driving, the motor not used for driving the crushing device can be uncoupled from the crushing device and does not have to be dragged along, allowing the mineral processing plant to be operated more efficiently.

One conceivable variant of the invention is such that the crushing device is accommodated by a machine chassis, which can be moved by means of one or more electric or electro-hydraulic travel drives, that at least one of the travel drives is supplied with power from the generator and/or from an external power supply and/or from an energy storage device.

The crushing device can thus be moved to its site of operation or between variable sites of operation. It is also conceivable to move the crushing device while crushing mineral material or the like. The process of the crushing device can be locally emission-free if the power supply is provided by the energy storage device or the external power supply.

Within the scope of the invention, provision may also be made for a control device to be provided, for the generator and/or an external power supply and/or the energy storage device to feed power into the control device, and for the control device to supply electric energy to the auxiliary units, to the electric motor and/or to the at least one travel drive.

This results in a simple design and simplified handling of the mineral processing plant. The operating mode can then be set centrally via the control device just like the aggregates can be switched on and off centrally via the control device. The control unit can be positioned in such a way that optimum use is made of the available installation space. It is also conceivable to provide the control device at an easily accessible location, which facilitates maintenance and operation.

A particularly preferred embodiment of the invention is characterized in that a hydraulic pump is disposed on the first and/or the second transmission, which hydraulic pump is driven by the first and/or the second transmission, and in that the hydraulic pump is connected to a hydraulic motor of a hydraulic unit, preferably to a fan, via a hydraulic line, in particular for cooling the internal combustion engine and/or the electric motor.

Thus, mechanical power can be provided by the respective transmissions via the hydraulic pump, for instance for further auxiliary units. The use of a hydraulic line makes for a low-loss transport of this power. Advantageously, a fan driven by a hydraulic motor can dissipate the heat loss from the electric motor and/or the internal combustion engine.

Within the scope of the invention, provision may in particular be made for the maximum continuous power output of the internal combustion engine to be 3 times P, for the maximum rated power input of the electric motor with a tolerance of 30% to be 2 times P (i.e. the electric motor has a maximum rated power input equal to 2 times P plus or minus 30% of 2 times P), and for the maximum rated power output of the generator with a tolerance of 30% to be 1 times P (i.e. the generator has a maximum rated power output equal to P plus or minus 30% of P).

In this way, the internal combustion engine can cover the entire power requirements of the plant. The electric motor can then be dimensioned in such a way that it can provide the drive power for the crushing device. The generator can be provided optimized with regard to the power requirements of the auxiliary units. The internal combustion engine, electric motor and generator can thus be optimally and energy-efficiently designed to meet the individual power requirements.

A compact design of the mineral processing plant is achieved if provision is made for the first clutch and the second clutch to be combined in the form of a double clutch in one assembly, wherein the clutches are preferably designed as fluid clutches, dog clutches, multi-disk clutches, friction clutches or free-wheel clutches.

A mineral processing plant according to the invention can be characterized in that, in a start-up mode with the crushing device at a standstill, the internal combustion engine is started and brought to an operating speed, and in that the power transmission is then built up over a time period, preferably continuously, or in that the stationary crushing device is first started up by means of the electric motor and in that the internal combustion engine is then coupled to the crushing device, preferably via the first clutch.

This permits the implementation of a simple and efficient start-up process. When the crushing device is started up using the electric motor, the internal combustion engine can be coupled to the crushing device that has already been started up, wherein both clutches can be designed simply and inexpensively in this case as hard-shifting clutches, for instance dog clutches.

The problem of the invention is also solved using a method.

The invention is explained in greater detail below based on an exemplary embodiment shown in the drawings. In the figures, FIG. 1 shows a simplified block diagram of a mineral processing plant, and FIG. 2 shows a simplified schematic diagram of the structure of a mineral processing plant.

Figure 2:
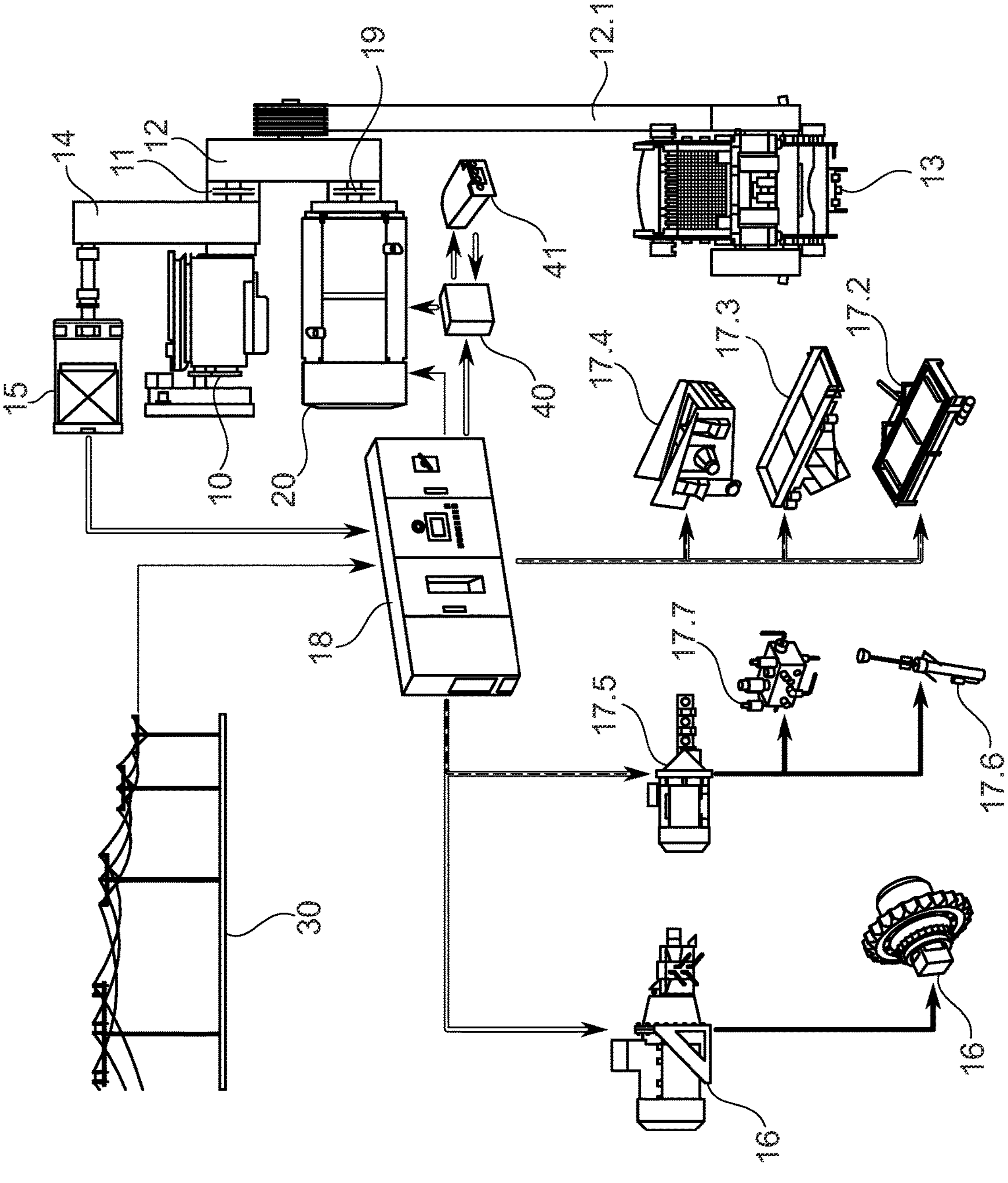

FIG. 1 shows a simplified block diagram of a mineral processing plant having a crushing device 13 and an internal combustion engine 10. The crushing device 13 may also be referred to as a crusher 13.

The crushing device 13 in this case is a jaw crusher, but it is also conceivable to use a different type of crusher, such as a rotary impact crusher, a gyratory crusher or a cone crusher. The internal combustion engine 10 may be a diesel engine or some other type of engine, such as a gasoline engine or a gas engine.

As can be seen in FIG. 1, the internal combustion engine 10 can be mechanically coupled to the crushing device 13. In this way, the internal combustion engine 10 can drive the crushing device 13.

In the illustrated exemplary embodiment, a first transmission 12 is provided in the drivetrain between the internal combustion engine 10 and the crushing device 13, which first transmission is coupled to the crushing device 13 by means of a drive 12.1. The first transmission 12 can be used to adjust torque and speed to the crushing device 13.

The drive 12.1 can be designed as a belt drive, for instance, which is connected to the output shaft of the transmission 12 and to the drive shaft of the crushing device 13.

Furthermore, a first clutch 11 is provided in the powertrain between the internal combustion engine 10 and the first transmission 12. The first clutch 11 establishes a mechanical connection between the output shaft of the internal combustion engine 10 and the input shaft of the transmission 12. However, the first clutch 11 can also be used to disconnect this mechanical connection.

Furthermore, the internal combustion engine 10 is mechanically coupled to a generator 15. In this way, the internal combustion engine 10 can drive the generator 15. The generator 15 can be used to convert mechanical output power of the internal combustion engine 10 into electric power. The generator 15 may also be referred to as the electric generator 15.

A second transmission 14 is disposed between the internal combustion engine 10 and the generator 15. The output shaft of the internal combustion engine 10 is coupled to the input shaft of the second transmission 14, and the output shaft of the second transmission 14 is coupled to the input shaft of the generator 15. The second transmission 14 permits the speed at the drive shaft of the generator 15 to be adjusted. In this case, the second transmission 14 and the generator 15 are provided as independent assemblies. However, it is also conceivable to provide a joint unit, for instance in the form of a transmission-generator.

As can be further seen in FIG. 1, an electric motor 20 is also mechanically coupled to the crushing device 13. The electric motor 20 is connected to the first transmission 12 via a second clutch 19. Thus, the internal combustion engine 10 and/or the electric motor 20 can drive the crushing device 13 when a connection is established to the first transmission 12 via the first clutch 11 and/or the second clutch 19, respectively.

The first clutch 11 and the second clutch 19 can be of identical design and/or designed for the respective powers to be transmitted. It is also conceivable to use different types of clutches, wherein fluid clutches, dog clutches, multi-disk clutches and/or free-wheel clutches, for instance, are feasible. In addition, the first clutch 11 and the second clutch 19 can also be designed as a joint unit, preferably in the form of a double clutch.

The generator 15 may be electrically connected to a control device 18, as in the exemplary embodiment shown in FIG. 1. In this way, the electric power provided by the generator 15 is at least partially directed to the control device 18. The control device 18 is used to control and supply power to the electric motor 20 and is electrically connected thereto, as can be seen in FIG. 1. The control device 18 may also be referred to as the power supply controller 18.

Furthermore, provision may also be made for the control device 18 in the illustrated exemplary embodiment to control auxiliary units 17 of the mineral processing plant and/or to supply them with electric power.

Furthermore, a travel drive 16 of the mineral processing plant may be provided, which travel drive is electrically connected to the control device 18. The mineral processing plant may be equipped with a single travel drive 16. However, it is also conceivable to provide several travel drives 16 in order, for instance, to be able to control and drive individual axles, wheels or chain drives of the mineral processing plant separately. The travel drive(s) 16 is or are used to move the mineral processing equipment.

In this case, an external power supply 30 may also be provided to supply electric power to the mineral processing plant. A mains connection can be used for this purpose, for instance. The external power supply 30 is electrically connected to the control device 18.

The mineral processing system illustrated herein may further comprise an energy storage device 40 that may be electrically coupled to the control device 18, to the external power supply 30, to the generator 15, and/or to the electric motor 20.

The energy storage device 40 is preferably designed as an accumulator. The energy storage device 40 can be charged by the external power supply 30 or by the generator 15. The energy stored in the energy storage device 40 can then be used to drive the electric motor 20. In addition, the stored energy of the energy storage device 40 can be used to operate auxiliary units 17 of the mineral processing plant via the control device 18. The travel drive 16 can also be supplied from the energy storage device 40, such that local emission-free motion of the mineral processing plant is possible even without any external power supply 30.

The energy storage device 40 may be directly connected to the generator 15, the electric motor 20, and the external power supply 30. However, it is also conceivable to design the connection of the energy storage device 40 to all or some of these components indirectly, for instance via the control device 18.

The control device 18 may include comparatively simple and/or even complex electric and/or electronic circuits and elements. It is also conceivable to assign the entire control and/or regulation of the mineral processing plant including, for instance, all main and/or auxiliary units and/or mechanical components such as transmissions 12, 14 and/or clutches 11, 19 and/or the electric power supply by the external power supply 30 and/or the energy storage device 40 and/or the control circuit 41 to the control device 18. The control and/or regulation implemented by the control device 18 can be fully or partially automated, for instance by predefined processing programs. However, it is also conceivable that a machine operator performs the actuation and/or control and/or regulation of the components and/or aggregates of the mineral processing plant entirely or partly via the control device 18.

As can be further seen in FIG. 1, a hydraulic pump 50 is coupled to the first transmission 12. Mechanical power from the first transmission 12 can be supplied to the hydraulic pump 50 via the coupling. The hydraulic pump 50 is connected, for instance, to a hydraulic power unit 51 via a hydraulic line, such that the latter can be driven. The hydraulic power unit 51 can be a fan. In this way, the hydraulic unit 51 can be used to dissipate heat losses, for instance from the internal combustion engine 10 and/or the electric motor 20.

A hydraulic pump 50 may also be coupled to the second transmission 14. It supplies a further hydraulic unit 51. In particular, it may also be a fan. It is conceivable that this fan dissipates the heat losses of the generator 15.

It is also possible to provide a hydraulic pump 50 and a hydraulic unit 51 only on the first transmission 12 or only on the second transmission 14. It is also conceivable to provide only one hydraulic pump 50, by means of which one or more hydraulic units 51 are supplied.

FIG. 2 shows a schematic diagram of the mineral processing plant shown in FIG. 1.

As mentioned above, the mineral processing plant may comprise one or more auxiliary units 17.

As shown in FIG. 2, this can be an auxiliary hydraulic system with a hydraulic unit 17.5, a hydraulic valve 17.7 and an actuator 17.6. It is also conceivable that one or more auxiliary hydraulics are provided, each containing all or only some of the hydraulic components mentioned.

The auxiliary units 17 shown in FIG. 2 may furthermore include a conveyor belt 17.2, a conveyor chute 17.3 and/or a screen 17.4. Not all of these auxiliary units 17 have to be present. It is also conceivable to provide these auxiliary units 17 in different numbers at the mineral processing plant.

As FIG. 2 further shows, a control circuit 41 may be provided to interface with the energy storage device 40. In this case, it is designed as a separate unit. However, the use of an energy storage device 40 with an integrated control circuit 41 is also conceivable. In the exemplary embodiment shown, the energy storage device 40 is an accumulator. The control circuit 41 performs battery management, for instance, to control the charging and discharging operations of the energy storage device 40.

The drive 12.1 is designed as a revolving belt drive as shown in FIG. 2. However, other drive forms such as a chain drive or a drive shaft are also conceivable.

Likewise, the first transmission 12 and the second transmission 14 are provided as belt drives. However, both transmissions 12, 14 can also be of a different design, such as gear drives or hydraulic transmissions. In addition, a different type of transmission than the first transmission 12 may be provided for the second transmission 14.

As can be seen in FIG. 2, the generator 15 and the internal combustion engine 10 are directly connected to and coupled via the second transmission 14.

It can also be seen that the input 12.1 is directly connected to the output of the first transmission 12. The electric motor 20 and the internal combustion engine 10 can be coupled to the first transmission 12 via the first and via the second clutch 11, 19, respectively.

The crushing device 13 is designed as a jaw crusher unit having two crushing jaws. The crushing device 13 may also comprise a rotary impact crusher, a gyratory crusher, or a cone crusher.

The operation of the mineral processing plant shown is described below.

In a first operating mode, the internal combustion engine 10 is mechanically connected to and drives the crushing device 13. For this purpose, this connection is established by the first clutch 11 and the first transmission 12. In this way, the mechanical output power of the internal combustion engine 10 drives the crushing device 13 directly without having to accept conversion losses, for instance by converting mechanical power into electric power. In this way, an optimum efficiency factor can be achieved.

At the same time, the internal combustion engine 10 is connected to and drives the generator 15 via the second transmission 14. In so doing, the generator 15 converts the mechanical power transmitted thereto by the internal combustion engine 10 into electric power. The electric output power of the generator 15 is at least partially made available to the auxiliary units 17 via the control device 18. At the same time, provision may be made for at least a portion of the electric output power of the generator 15 to be fed into the energy storage device 40 for charging purposes.

In this first mode of operation, the electric motor 20 is mechanically disconnected from the crushing device 13. The second clutch 19 mechanically separates the electric motor 20 from the first transmission 12. Thus, the electric motor 20 does not contribute to driving the crushing device 13 and can be switched off to save energy. The mechanical separation from the drivetrain also means that the electric motor 20 does not have to be dragged along.

As a result of the internal combustion engine 10 driving the generator 15, electric power is converted from a portion of the mechanical drive power of the internal combustion engine 10, which can also be partially supplied to the travel drive 16 via the control device 18. Thus, in this first operating mode it is also possible to move the mineral processing plant during crushing operation. However, this is not always desirable, i.e., the mineral processing equipment may also remain stationary during this first mode of operation.

In a second mode of operation, the electric motor 20 is mechanically connected to the crushing device 13. The second clutch 19 mechanically connects the electric motor 20 to the first transmission 12. Thus, in this second mode of operation, the electric motor 20 accomplishes driving the crushing device 13.

The internal combustion engine 10 is mechanically disconnected from the crushing device 13 in this second operating mode. For this purpose, the separation is effected by the first clutch 11. At the same time, the internal combustion engine 10 is connected to the generator 15 via the second transmission 14 and can drive the former.

The mineral processing plant can be supplied with electric power via the external power supply 30. For instance, sufficient electric power can be provided via the external power supply 30 such that the internal combustion engine 10 can be switched off. In this way, the mineral processing plant can be operated locally without emissions. Since the first clutch 11 separates the internal combustion engine 10 from the drivetrain, no drag losses occur in this case. In this way a locally emission-free operation is rendered possible.

However, it is also possible for the internal combustion engine 10 to operate in this second mode of operation to drive the generator 15 for the purpose of obtaining electric power.

The electric output power of the generator 15 is then provided, at least in part, to the electric motor 20 via the control device 18 to drive the former. At the same time, at least a portion of the electric output power of the generator 15 can also be made available to auxiliary units 17 and/or fed into the energy storage device 40. Preferably, the energy storage device 40 can be charged when the mineral processing plant is dealing with a low load.

In this way, a stand-alone operation of the mineral processing plant independent of the external feed 30 can be implemented.

However, it is also conceivable that only part of the required electric power is provided via the external feed 30. In that case, the remaining demand for electric power can be covered by additionally operating the internal combustion engine 10 and driving the generator 15. Because the internal combustion engine 10 is mechanically disconnected from the crushing device 13 by the first clutch 11, the internal combustion engine 10 can be operated at partial load, for instance, in accordance with the need for additional electric power.

In so doing, in particular for the process of the mineral processing plant, the travel drive 16 can be supplied with electric power exclusively or in part via the internal combustion engine 10 and the generator 15. It is also conceivable to cover the electric power requirement of the travel drive 16 via the external power supply 30. However, the distances to be covered may be limited, for instance, by a limited available cable length.

It is also possible to charge the energy storage device 40 in the second operating mode. The electric energy required for this purpose can be provided by the external power supply 30 and/or, if the internal combustion engine 10 is operated, by the generator 15. Preferably, the energy storage device 40 is charged when the load on the mineral processing equipment is low.

In a third mode of operation, both the internal combustion engine 10 and the electric motor 20 are mechanically connected to the crushing device 13. The connection between the internal combustion engine 10 and the electric motor 20 is implemented via the first clutch 11 and via the second clutch 19. Thus, the mechanical output powers of both the internal combustion engine 10 and the electric motor 20 act on the crushing device 13 via the first transmission 12 and the drive 12.1.

In this regard, it is conceivable that the internal combustion engine 10 is designed to meet the average power requirements of the mineral processing plant. The electric motor 20 can absorb peak loads occurring during operation. In this way, the internal combustion engine 10 can be dimensioned smaller. In particular, in the third mode, the electric motor 20 may be powered by electric energy from the energy storage device 40. Alternatively or additionally, the external power supply 30 can be used for this purpose.

Because the internal combustion engine 10 is mechanically coupled to and drives the generator 15, electric power is also provided by the generator 15 in the third operating mode. It can be used to supply the auxiliary units 17 and/or the travel drive 16 and/or to charge the energy storage device 40.

In all of the above-mentioned operating modes, it is possible to cool the operated units, such as internal combustion engine 10 and/or electric motor 20, by means of the hydraulic units 51 connected to the respective transmissions 12, 14 via hydraulic pump 50.

The crushing device 13 requires a high torque to start up from standstill. This torque can be provided by the electric motor 20 when it is supplied with electric power via the external power supply 30 and/or the energy storage device 40 and/or the generator 15. In so doing, the internal combustion engine 10 is mechanically disconnected from the crushing device 13 by means of the first clutch 11. If desired, the internal combustion engine 10 can be mechanically coupled to the crushing device 13 after the crushing device 13 has started up.

It is also possible that in a start-up mode, while the crushing device 13 is stationary, the internal combustion engine 10 is started and brought to an operating speed. In so doing, the mechanical connection to the crushing device 13 is initially interrupted by the first clutch 11. The power flow between the internal combustion engine 10 and the crushing device 13 is then gradually established via the first clutch 11, similar to a motor vehicle with a manual transmission.

The invention claimed is:

1. A mineral processing plant for crushing mineral material, comprising:
- a crusher;
- an internal combustion engine;
- an electric generator mechanically coupled to the internal combustion engine such that the electric generator may be driven by the internal combustion engine;
- one or more auxiliary units electrically connected to the electric generator such that the electric generator may provide electric power to the one or more auxiliary units; and
- an electric motor separate from the electric generator;
- wherein in a first mode of operation the internal combustion engine is mechanically coupled to the crusher to drive the crusher; and
- wherein in a second mode of operation the electric motor is mechanically coupled to the crusher to drive the crusher.

2. The mineral processing plant of claim 1, wherein:
- in the first mode of operation the electric motor is mechanically disconnected from the internal combustion engine and the electric generator by a clutch.

3. The mineral processing plant of claim 1, further comprising:
- a clutch configured to selectively couple the electric motor to the crusher;
- wherein in the first mode of operation the electric motor is disconnected from the crusher by the clutch; and
- wherein in the second mode of operation the electric motor is connected to the crusher by the clutch.

4. The mineral processing plant of claim 1, wherein:

in a third mode of operation both the internal combustion engine and the electric motor are mechanically coupled to the crusher to drive the crusher.

5. The mineral processing plant of claim 4, further comprising:

an accumulator for storing electrical energy;

wherein in the first mode of operation the accumulator is electrically connected to the electric generator such that the accumulator is charged by the electric generator; and wherein in the third mode of operation the electric motor is supplied with electric energy from the accumulator and/or from an external power supply.

6. The mineral processing plant of claim 1, further comprising:

a first clutch configured to selectively couple the internal combustion engine to the crusher;

wherein in the first mode of operation the first clutch couples the internal combustion engine to the crusher; and wherein in the second mode of operation the first clutch disconnects the internal combustion engine from the crusher.

7. The mineral processing plant of claim 1, further comprising:

a first transmission connecting the internal combustion engine to the crusher in the first mode of operation.

8. The mineral processing plant of claim 7, further comprising:

a second transmission connecting the internal combustion engine to the generator.

9. The mineral processing plant of claim 7, wherein:

the first transmission is integrated in a drivetrain between the internal combustion engine and the crusher and between the electric motor and the crusher.

10. The mineral processing plant of claim 9, further comprising:

the first clutch is integrated in the drivetrain between the internal combustion engine and the first transmission; and a second clutch is integrated in the drivetrain between the electric motor and the first transmission.

11. The mineral processing plant of claim 1, further comprising:

a machine chassis;

one or more electric or electrohydraulic travel drives configured to move the machine chassis; and an accumulator for storing electrical energy;

wherein at least one of the one or more travel drives is supplied with electric power from the generator and/or from an external power supply and/or from the accumulator.

12. The mineral processing plant of claim 11, further comprising:

a power supply controller configured to receive electrical power from the generator and/or from the external power supply and/or from the accumulator, the power supply controller being further configured to supply electrical power to the one or more auxiliary units and/or to the electric motor and/or to the at least one of the one or more travel drives.

13. The mineral processing plant of claim 1, further comprising:

a first transmission connecting the internal combustion engine to the crusher in the first mode of operation;

a second transmission connecting the internal combustion engine to the generator;

a hydraulic pump connected to and driven by the first or second transmission; and a hydraulic motor connected to the hydraulic pump by a hydraulic line, the hydraulic motor being connected to a fan to drive the fan for cooling of the internal combustion engine and/or the electric motor.

14. The mineral processing plant of claim 1, wherein:

the internal combustion engine has a maximum continuous power output equal to 3 times P;

the electric motor has a maximum rated power input equal to 2 times P plus or minus 30% of 2 times P; and the generator has a maximum rated power output equal to P plus or minus 30% of P.

15. The mineral processing plant of claim 1, further comprising:

a first clutch configured to selectively couple the internal combustion engine to the crusher;

a second clutch configured to selectively couple the electric motor to the crusher;

wherein the first clutch and the second clutch are combined in one assembly as a double clutch.

16. The mineral processing plant of claim 15, wherein:

the first and second clutches are fluid clutches, dog clutches, multi-disk clutches or free-wheel clutches.

17. The mineral processing plant of claim 1, wherein:

in a start-up mode of operation with the crusher at a standstill, the internal combustion engine is started and brought up to an operating speed, and then power transmission from the internal combustion engine to the crusher is built up over a period of time.

18. The mineral processing plant of claim 1, wherein:

in a start-up mode of operation with the crusher at a standstill, the crusher is first started up by the electric motor, and then the internal combustion engine is coupled to the crusher by a clutch.

19. A method of operating a mineral processing plant for crushing mineral material, the mineral processing plant including a crusher, an internal combustion engine, an electric generator mechanically coupled to the internal combustion engine, and an electric motor separate from the electric generator, the method comprising:

in a first mode of operation mechanically coupling the internal combustion engine to the crusher and driving the crusher with the internal combustion engine; and in a second mode of operation mechanically coupling the electric motor to the crusher and driving the crusher with the electric motor.

20. The method of claim 19, further comprising:

in a third mode of operation mechanically coupling both the internal combustion engine and the electric motor to the crusher and driving the crusher with both the internal combustion engine and the electric motor.

* * * * *